US011194006B2

(12) United States Patent
Ono et al.

(10) Patent No.: US 11,194,006 B2
(45) Date of Patent: Dec. 7, 2021

(54) ANGLE-OF-ARRIVAL IDENTIFICATION DEVICE, TOLL COLLECTION SYSTEM, AND ANGLE-OF-ARRIVAL IDENTIFICATION METHOD (71) Applicant: MITSUBISHI HEAVY INDUSTRIES MACHINERY SYSTEMS, LTD., Kobe (JP)

(72) Inventors: Yoshihito Ono, Tokyo (JP); Takashi Maeda, Tokyo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 245 days.

(21) Appl. No.: 16/488,018

(22) PCT Filed: Mar. 1, 2017

(86) PCT No.: PCT/JP2017/008089
§ 371 (c)(1),
(2) Date: Aug. 22, 2019

(87) PCT Pub. No.: WO2018/158876
PCT Pub. Date: Sep. 7, 2018

(65) Prior Publication Data
US 2020/0174093 A1 Jun. 4, 2020

(51) Int. Cl.
*G01S 3/48* (2006.01)
(52) U.S. Cl.
CPC ............ *G01S 3/48* (2013.01); *G06Q 2240/00* (2013.01)
(58) Field of Classification Search
CPC ............................... G01S 3/48; G06Q 2240/00
(Continued)

(56) References Cited

U.S. PATENT DOCUMENTS 6,191,649 B1  2/2001 Sugita et al.
2008/0039028 A1  2/2008 Nishida et al.
(Continued)

FOREIGN PATENT DOCUMENTS

EP  2941069 A2  11/2015
JP  H07-273821 A  10/1995
(Continued)

OTHER PUBLICATIONS

PCT/ISA/210, "International Search Report for International Application No. PCT/JP2017/008089," dated May 23, 2017.
(Continued)

*Primary Examiner* — Bo Fan
(74) *Attorney, Agent, or Firm* — Manabu Kanesaka; Kenneth Berner; Benjamin Hauptman (57) ABSTRACT An angle-of-arrival identification device receives a reception signal including a plurality of subcarriers, using a plurality of antenna elements, and identifies an angle of arrival of the reception signal. The angle-of-arrival identification device includes signal processing units that extract predefined specific subcarriers (pilot carriers) from the reception signals received by each of the plurality of antenna elements, and an angle identification unit that identifies the angle of arrival on the basis of a phase difference between the specific subcarriers extracted by each of the signal processing units. The signal processing unit includes a frequency adjustment unit that adjusts a deviation, from a defined value, of a frequency of the reception signal received by the antenna element, and a filter unit that extracts the specific subcarrier by performing bandpass filter processing on the reception signal whose frequency has been adjusted.

5 Claims, 8 Drawing Sheets (58) Field of Classification Search
USPC .................................. 342/442, 146, 357.25
See application file for complete search history.

(56) References Cited

U.S. PATENT DOCUMENTS

| | | |
|---|---|---|
| 2010/0008346 A1 | 1/2010 | Shirakata et al. |
| 2013/0063300 A1* | 3/2013 | O'Regan ................. G01S 19/14 342/357.25 |
| 2018/0038935 A1 | 2/2018 | Iizuka et al. |

FOREIGN PATENT DOCUMENTS

| | | |
|---|---|---|
| JP | 2000-022772 A | 1/2000 |
| JP | 2001-211218 A | 8/2001 |
| JP | 2001-339454 A | 12/2001 |
| JP | 2002-094585 A | 3/2002 |
| JP | 2002-094586 A | 3/2002 |
| JP | 2003-032221 A | 1/2003 |
| JP | 2005-257595 A | 9/2005 |
| JP | 2007-281991 A | 10/2007 |
| JP | 2008-047999 A | 2/2008 |
| JP | 2016-194454 A | 11/2016 |
| WO | 2008/136200 A1 | 11/2008 |

OTHER PUBLICATIONS

PCT/ISA/237, "Written Opinion of the International Searching Authority for International Application No. PCT/JP2017/008089," dated May 23, 2017.

\* cited by examiner

ANGLE-OF-ARRIVAL IDENTIFICATION DEVICE, TOLL COLLECTION SYSTEM, AND ANGLE-OF-ARRIVAL IDENTIFICATION METHOD

RELATED APPLICATIONS

The present application is National Phase of International Application No. PCT/JP2017/008089 filed Mar. 1, 2017, the disclosure of which is hereby incorporated by reference herein in its entirety.

TECHNICAL FIELD

The present invention relates to an angle-of-arrival identification device, a toll collection system, and an angle-of-arrival identification method.

BACKGROUND ART

An electronic toll collection system (ETC: Electronic Toll Collection System (trade name), which is also referred to as an "automatic toll collection system"), is already being utilized as an application in the Intelligent Transport System (ITS: Intelligent Transport System). According to this electronic toll collection system, tolls for the toll road can be collected via dedicated short range communications (DSRC: Dedicated Short Range Communications) between a roadside antenna (a dedicated short range communication antenna) installed at a tollgate, and an onboard unit mounted on a vehicle.

In the current electronic toll collection system, wireless communications are performed between the roadside antenna and the onboard unit using the DSRC method, but in the next-generation electronic toll collection system, a wireless communication method called WAVE (IEEE802.11p) is scheduled to be adopted. The DSRC method is a communication method that uses a single carrier, but the WAVE method is an orthogonal frequency-division multiplexing (OFDM) method that multiplexes a plurality of subcarriers (subcarriers).

However, when wireless communications are performed between the roadside antenna and the onboard unit, there is a problem that the roadside antenna may perform unexpected communication (false communication) with a vehicle located outside a dedicated short range communication region, which is defined for performing standard dedicated short range wireless communications. For example, due to reflection of the radio waves by a structure such as a roof of a tollgate, the roadside antenna may perform false communication with an onboard unit of another vehicle that travels behind the vehicle present in the dedicated short range communication region (the vehicle that should actually perform the wireless communication).

In order to resolve such a problem, utilization of an Angle-of-Arrival (AOA) antenna has been discussed. By using the AOA antenna, an angle of arrival of the radio wave transmitted from the onboard unit can be identified. The electronic toll collection system only performs toll collection processing using wireless communications when the angle of arrival of the radio wave is within a normal range.

Patent Document 1 describes a technology for calculating the angle of arrival of a communication signal (radio wave) that has been frequency-division-multiplexed based on the OFDM method.

CITATION LIST

Patent Document

Patent Document 1: JP 2016-194454 A

SUMMARY OF INVENTION

Technical Problem

From the perspectives of cost saving and processing speed improvement, simplification of signal processing is required for an angle-of-arrival identification device that identifies an angle of arrival of an OFDM-type communication signal.

In light of the above-described problem, the present invention provides an angle-of-arrival identification device, a toll collection system, and an angle-of-arrival identification method that can identify an angle of arrival of a frequency-division-multiplexed radio wave by simple signal processing.

Solution to Problem

According to a first aspect of the present invention, an angle-of-arrival identification device (1) is a device that receives a reception signal including a plurality of subcarriers, using a plurality of antenna elements (10), and identifies an angle of arrival of the reception signal. The angle-of-arrival identification device includes a signal processing unit (15) configured to extract a predefined specific subcarrier from the reception signal received using each of the plurality of antenna elements, and an angle identification unit (19) configured to identify the angle of arrival based on a phase difference of the specific subcarrier extracted from each of the signal processing units. The signal processing unit includes a frequency adjustment unit (156a, 156b) configured to adjust a deviation, from a defined value, of a frequency of the reception signal received using the antenna element, and a filter unit (157a, 157b) configured to extract the specific subcarrier by performing bandpass filter processing on the reception signal whose frequency has been adjusted.

In this way, only a desired subcarrier can be directly extracted from the reception signal including the plurality of subcarriers (without performing a fast Fourier transform). Then, the angle of arrival of a radio wave can be identified on the basis of the phase difference of the extracted subcarrier.

As described above, the angle of arrival of the frequency-division-multiplexed radio wave can be identified by simple signal processing.

Further, according to a second aspect of the present invention, the signal processing unit further includes an amplitude adjustment unit (152) configured to adjust, to a predetermined magnitude, an amplitude of the reception signal received using the antenna element.

In this way, the signal strength (amplitude) is automatically adjusted such that the signal strength (amplitude) is always constant. Thus, distortion of the signal by an amplifier is reduced, and the processing for extracting the subcarrier can be stabilized.

Further, according to a third aspect of the present invention, the specific subcarrier is a pilot carrier (SCp) on which phase modulation for data transmission is not performed.

In this way, a phase comparison between the reception signals (pilot carriers) received by each of the plurality of antenna elements can be conveniently performed.

According to a fourth aspect of the present invention, the signal processing unit extracts a plurality of the pilot carriers having mutually different frequencies.

In this way, the angle-of-arrival identification device becomes less susceptible to the influence of multipath fading, and reliability of the function to identify the angle of arrival can be improved.

According to a fifth aspect of the present invention, a toll collection system includes the angle-of-arrival identification device according to any one of the first to fourth aspects.

According to a sixth aspect of the present invention, an angle-of-arrival identification method is a method that receives a reception signal including a plurality of subcarriers, using a plurality of antenna elements, and identifies an angle of arrival of the reception signal. The angle-of-arrival identification method includes a signal processing step for extracting a predefined specific subcarrier from the reception signal received using each of the plurality of antenna elements, and an angle identifying step for identifying the angle of arrival based on a phase difference of the specific subcarrier extracted in each of the signal processing steps. The signal processing step includes a frequency adjustment step for adjusting a deviation, from a defined value, of a frequency of the reception signal received by the antenna element, and a filtering step for extracting the specific subcarrier by performing bandpass filter processing on the reception signal whose frequency has been adjusted.

Advantageous Effect of Invention

According to the angle-of-arrival identification device, the toll collection system, and the angle-of-arrival identification method described above, the angle of arrival of the frequency-division-multiplexed radio wave can be identified by simple signal processing.

DESCRIPTION OF EMBODIMENTS

First Embodiment

Hereinafter, with reference to FIG. 1 to FIG. 7, a toll collection system and an angle-of-arrival identification device according to a first embodiment will be described in detail.

Overall Configuration of Toll Collection System

Figure 1:
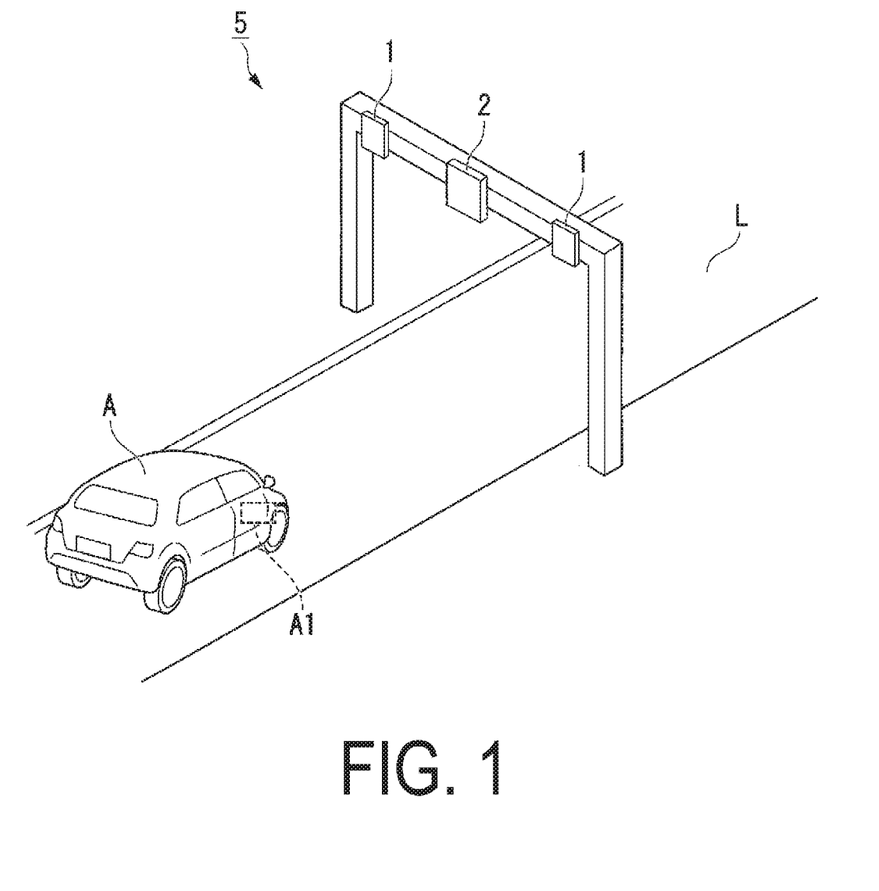
FIG. 1 is a diagram illustrating an overall configuration of a toll collection system according to a first embodiment.

FIG. 1 is a diagram illustrating an overall configuration of the toll collection system according to the first embodiment.

A toll collection system 5 according to the first embodiment is an electronic toll collection system installed at an entrance tollgate or an exit tollgate of a highway (hereinafter referred to as a tollgate and the like), for example. The toll collection system 5 performs wireless communications with a vehicle passing through the tollgate and the like, and automatically performs toll collection processing.

As illustrated in FIG. 1, the toll collection system 5 is installed on a roadside of a lane L of the tollgate and the like. The toll collection system 5 includes an angle-of-arrival identification device 1 and an antenna for toll collection 2 (a roadside antenna).

The angle-of-arrival identification device 1 is a device for identifying an angle of arrival of a radio wave transmitted by an onboard unit A1 mounted on a vehicle A during the wireless communications for the toll collection processing.

The antenna for toll collection 2 is a roadside antenna for performing the wireless communications with the onboard unit A1 mounted on the vehicle A and for performing the toll collection processing.

In the wireless communications performed between the antenna for toll collection 2 and the onboard unit A1 according to the present embodiment, a wireless communication method called a WAVE (IEEE802.11p) method is employed. The WAVE method is an orthogonal frequency-division multiplexing (OFDM) method that performs wireless communications using a plurality of frequency-division-multiplexed subcarriers.

For example, in the WAVE method, a frequency band having a center frequency of 5900 MHz and a channel width of 10 MHz is allocated for one channel. Then, the allocated frequency band is further divided into 64 subcarriers, each of which has a subcarrier width of 0.15625 MHz. In the present embodiment, 12 of the 64 subcarriers are Null carriers (no content), and the remaining 52 subcarriers are utilized.

48 of the 52 subcarriers are called data carriers and utilized to transmit data. Specifically, the 48 data carriers are phase-modulated on the basis of the data to be transmitted and propagated through the atmosphere.

Further, four of the 52 subcarriers are called pilot carriers and are utilized to secure demodulation processing (synchronization) on the reception side (the antenna for toll collection 2). Since the pilot carriers are not utilized for transmitting data, the pilot carriers are not phase-modulated.

Note that, in the WAVE method, it is predefined which subcarriers of the 52 subcarriers are utilized as the pilot carriers (or as the data carriers). For example, it is predefined that the four pilot carriers are the seventh and twenty-first subcarriers as counted from the center frequency (5900 MHz) toward the lower frequency side, and the seventh and twenty-first subcarriers as counted from the center frequency toward the higher frequency side.

In FIG. 1, when the vehicle A enters a predetermined communicable region of the lane L, the wireless communications are started between the antenna for toll collection 2 and the onboard unit A1 of the vehicle A. At this time, the angle-of-arrival identification device 1 receives OFDM-type communication signals (reception signals each including a plurality of the subcarriers), which are the radio waves transmitted from the onboard unit A1. Then, the angle-of-arrival identification device 1 identifies the angle of arrival of the received communication signal. When the toll collection system 5 determines that the angle of arrival of the radio wave identified by the angle-of-arrival identification device 1 is within a correct range (when it is determined that a vehicle is present in the predetermined communication region), the toll collection system 5 performs, with respect to the onboard unit A1, the toll collection processing through the antenna for toll collection 2.

Functional Configuration of Angle-of-Arrival identification Device

Figure 2:
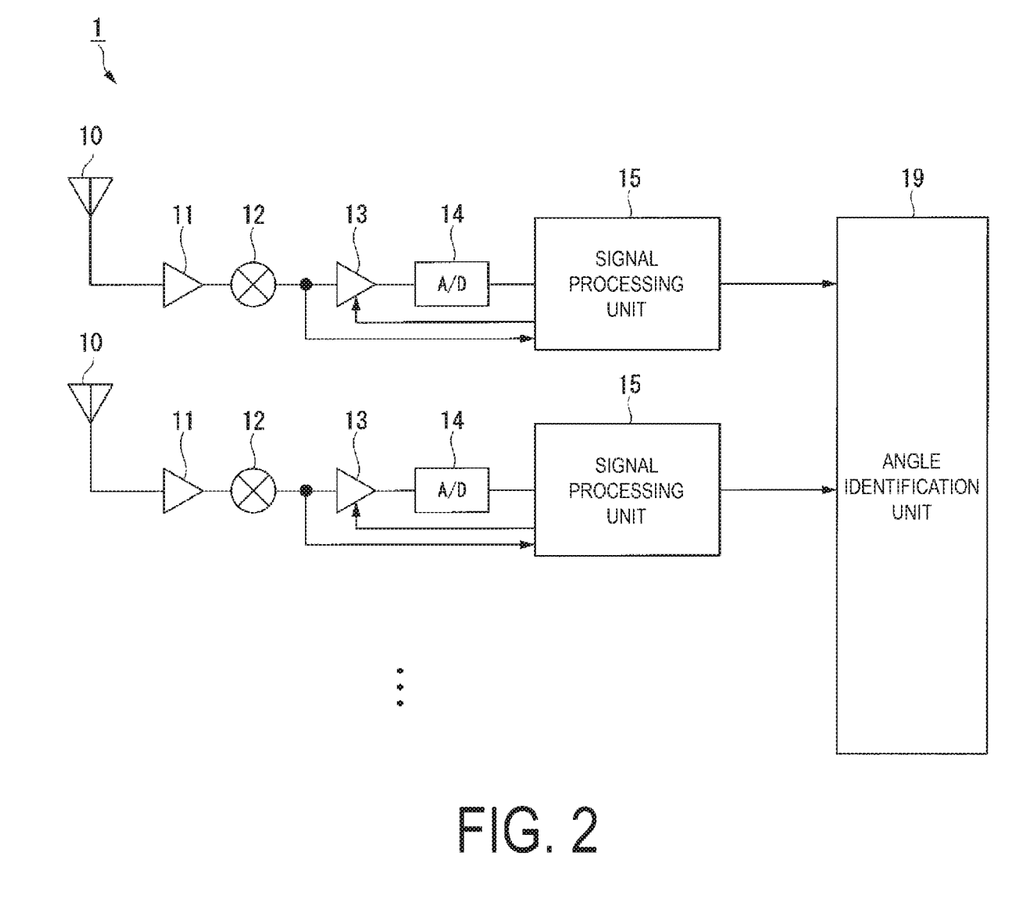
FIG. 2 is a diagram illustrating a functional configuration of an angle-of-arrival identification device according to the first embodiment.

FIG. 2 is a diagram illustrating a functional configuration of the angle-of-arrival identification device according to the first embodiment.

With reference to FIG. 2, the functional configuration of the angle-of-arrival identification device 1 will be described.

As illustrated in FIG. 2, the angle-of-arrival identification device 1 includes a plurality of antenna elements 10, and a plurality of high-frequency amplifiers 11, a plurality of mixers 12, a plurality of variable amplifiers 13, a plurality of A/D converters 14, and a plurality of signal processing units 15 that are provided in association with each of the antenna elements 10. Further, the angle-of-arrival identification device 1 includes an angle identification unit 19 connected to each of the plurality of signal processing units 15.

The plurality of antenna elements 10 receive the radio waves (OFDM-type communication signals) transmitted from the onboard unit A1 at each installed location.

The high-frequency amplifier 11 amplifies the received reception signal (OFDM-type communication signal) received by the antenna element 10.

The mixer 12 mixes the reception signal, which has been amplified through the high-frequency amplifier 11, with an output signal from a local transmitter (not illustrated), and converts the reception signal to an intermediate frequency.

The variable amplifier 13 adjusts the reception signal, which has been converted to the intermediate frequency by the mixer 12, to a predetermined amplitude, and outputs the reception signal. The adjustment of the amplitude by the variable amplifier 13 will be described later.

The A/D converter 14 samples the reception signal (analog signal) that has been adjusted to the predetermined amplitude by the variable amplifier 13, and converts the reception signal to a digital signal.

The signal processing unit 15 is a digital signal processing circuit realized by a field-programmable gate array (FPGA) and the like, for example. Each of the signal processing units 15 extracts predefined specific subcarriers from the reception signals (the digital signals input via the A/D converters 14) received by each of the plurality of antenna elements 10. In the present embodiment, each of the signal processing units 15 extracts the pilot carrier as the "specific subcarrier."

Further, each of the signal processing units 15 outputs a signal indicating a phase of the extracted pilot carrier (a pilot carrier phase signal) to the angle identification unit 19.

The angle identification unit 19 identifies a phase difference between the reception signals received by each of the antenna elements 10 on the basis of the pilot carrier phase signals output from the plurality of signal processing units 15. Then, the angle identification unit 19 identifies the angle of arrival of the reception signals (the radio waves transmitted from the onboard unit A1) on the basis of the identified phase difference. Since processing for identifying the angle of arrival of the reception signals on the basis of the phase difference between the reception signals is a generally well-known technology, a detailed description thereof is omitted herein.

Functional Configuration of Signal Processing Unit

Figure 3:
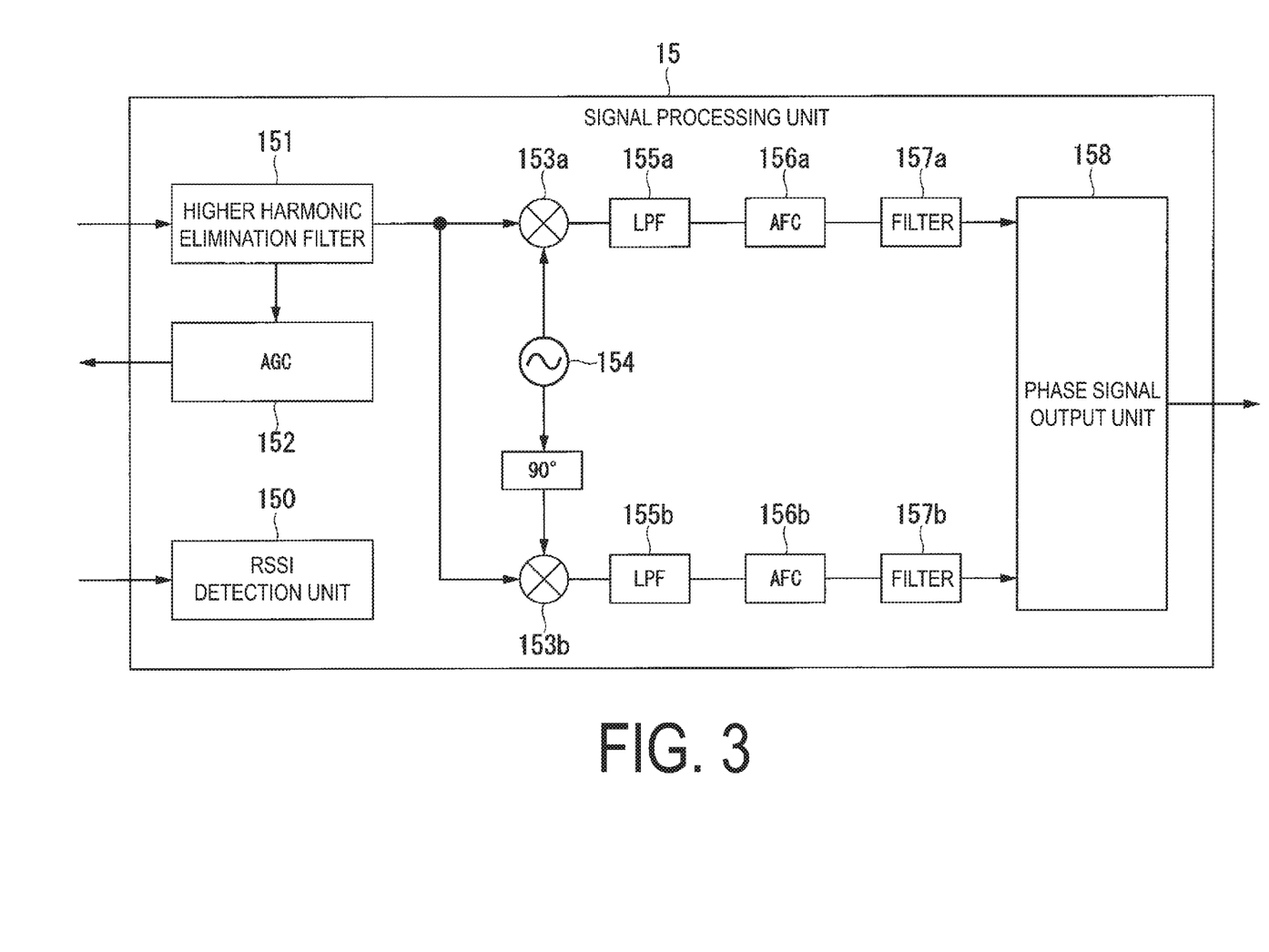
FIG. 3 is a diagram illustrating a functional configuration of a signal processing unit according to the first embodiment.

FIG. 3 is a diagram illustrating a functional configuration of the signal processing unit according to the first embodiment.

Next, functions of the signal processing unit 15 will be described in more detail with reference to FIG. 3.

As illustrated in FIG. 3, the signal processing unit 15 includes an RSSI detection unit 150, a higher harmonic elimination filter 151, an automatic amplitude control unit (AGC: Automatic Gain Control) 152, mixers 153a and 153b, a local transmitter 154, low pass filters 155a and 155b, automatic frequency control units (AFC: Automatic Frequency Control) 156a and 156b, pilot carrier extraction filters 157a and 157b, and a phase signal output unit 158.

The RSSI detection unit 150 determines whether the strength of the reception signal, namely, a Reception Signal Strength Indication (RSSI), is greater than or equal to a predetermined value. In the present embodiment, the RSSI detection unit 150 detects the strength of the reception signal that has been converted to the intermediate frequency by the mixer 12 (see FIG. 2).

The higher harmonic elimination filter 151 is a so-called low pass filter, and eliminates higher harmonic noise in the reception signal.

The automatic amplitude control unit 152 receives the reception signal after the higher harmonic noise has been eliminated, and acquires the signal strength (amplitude) of the reception signal. Then, the automatic amplitude control unit 152 outputs, to the variable amplifier 13 (FIG. 2), a variable amplifier control signal corresponding to the acquired signal strength. The automatic amplitude control unit 152 performs feedback control of the variable amplifier 13 such that the signal strength of the reception signal is constant at a predetermined signal strength target value.

The mixers 153a and 153b, the local transmitter 154, and the low pass filters 155a and 155b perform processing for extracting an I-component and a Q-component from the reception signal. Specifically, the mixers 153a and 153b multiply the reception signal, which has been input via the higher harmonic elimination filter 151, by a regenerative signal from the local transmitter 154. Here, in the mixer 153a, the I-component of the reception signal is extracted as a result of the reception signal being multiplied by the regenerative signal having the same phase as the reception signal. In addition, in the mixer 153b, the Q-component of the reception signal is extracted as a result of the reception signal being multiplied by the regenerative signal having a phase shifted by 90 degrees from that of the reception signal.

The automatic frequency control units 156a and 156b automatically adjust the frequency of the reception signal (the 1-component and the Q-component).

Here, it is described that the center frequency of a channel is defined as being 5900 MHz, for example, but an error of approximately 20 ppm is actually tolerated in terms of a given standard. In this case, it is assumed that the center frequency of the radio wave (channel) transmitted from the onboard unit A1 may have an error of up to approximately ±118 kHz (20 ppm of 5900 MHz). Thus, the automatic frequency control units 156a and 156b measure the actual center frequency of the reception signal, and detect a frequency error between the measured center frequency and the defined center frequency (5900 MHz). Then, the automatic frequency control units 156a and 156b adjust the frequency of the entire reception signal by adding or subtracting the frequency such that the detected frequency error is zero. As a result, with respect to the entire reception signal, which includes all of the 52 subcarriers, the frequency error occurring up to approximately 20 ppm is reduced.

The pilot carrier extraction filters 157a and 157b are digital bandpass filters that allow only the frequency components of the subcarrier that is predefined as the pilot carrier, of the reception signal, to pass through. The pilot carrier extraction filters 157a and 157b are preferably finite impulse response (FIR) filters and the like, which do not cause a phase delay.

As described above, the pilot carrier is predefined as the seventh (twenty-first) subcarrier as counted from the center frequency (5900 MHz) of the channel toward the lower frequency side, for example. The pilot carrier extraction filters 157a and 157b are adjusted so as to have filter characteristics that allow only the one predefined pilot carrier to pass through as described above, and remove all the other subcarriers.

The phase signal output unit 158 inputs an I-signal and a Q-signal of the one pilot carrier extracted through the pilot carrier extraction filters 157a and 157b, and outputs a signal indicating the phase of the pilot carrier (the pilot carrier phase signal).

Processing Flow of Signal Processing Unit

Figure 4:
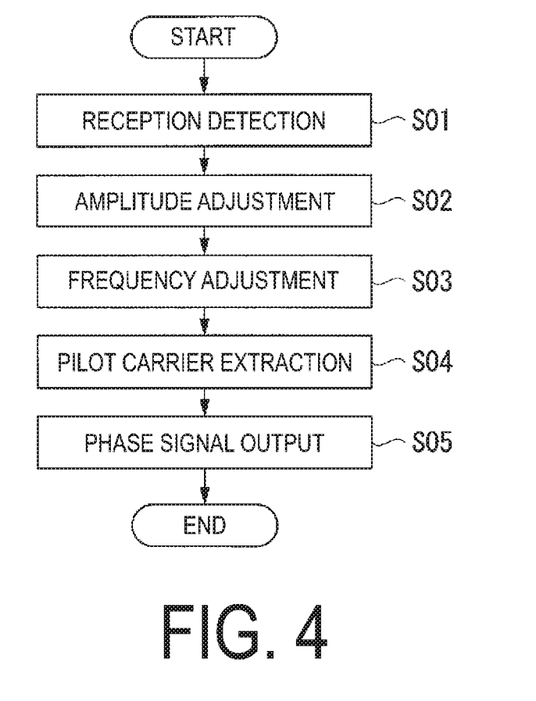
FIG. 4 is a diagram illustrating a processing flow of the signal processing unit according to the first embodiment.

FIG. 4 is a diagram illustrating a processing flow of the signal processing unit according to the first embodiment.

Figure 5:
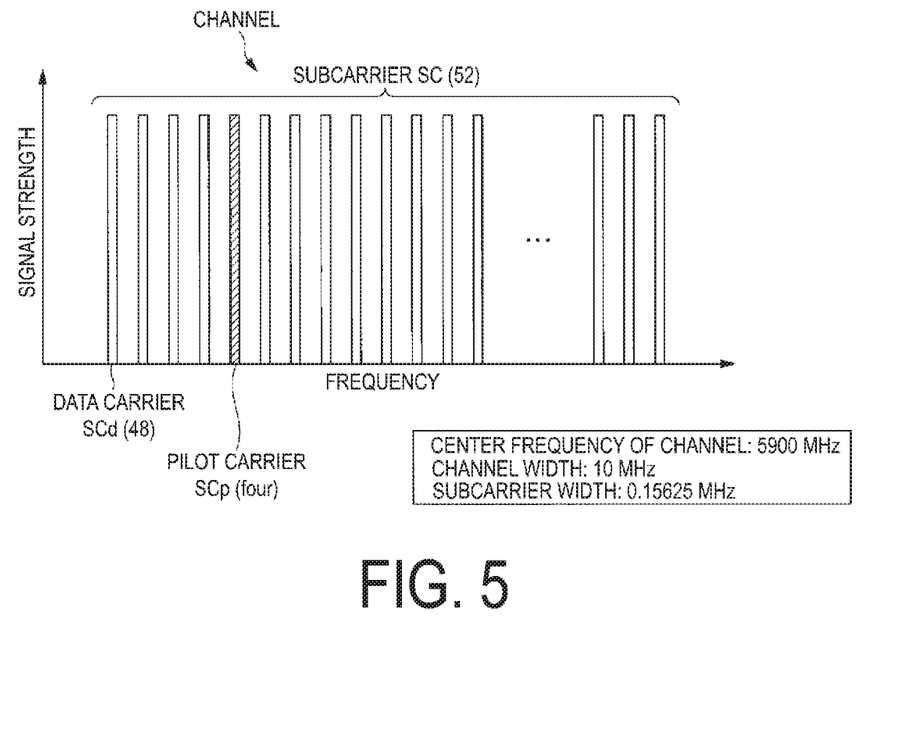
FIG. 5 is a first diagram for explaining processing of the signal processing unit according to the first embodiment.
Figure 6:
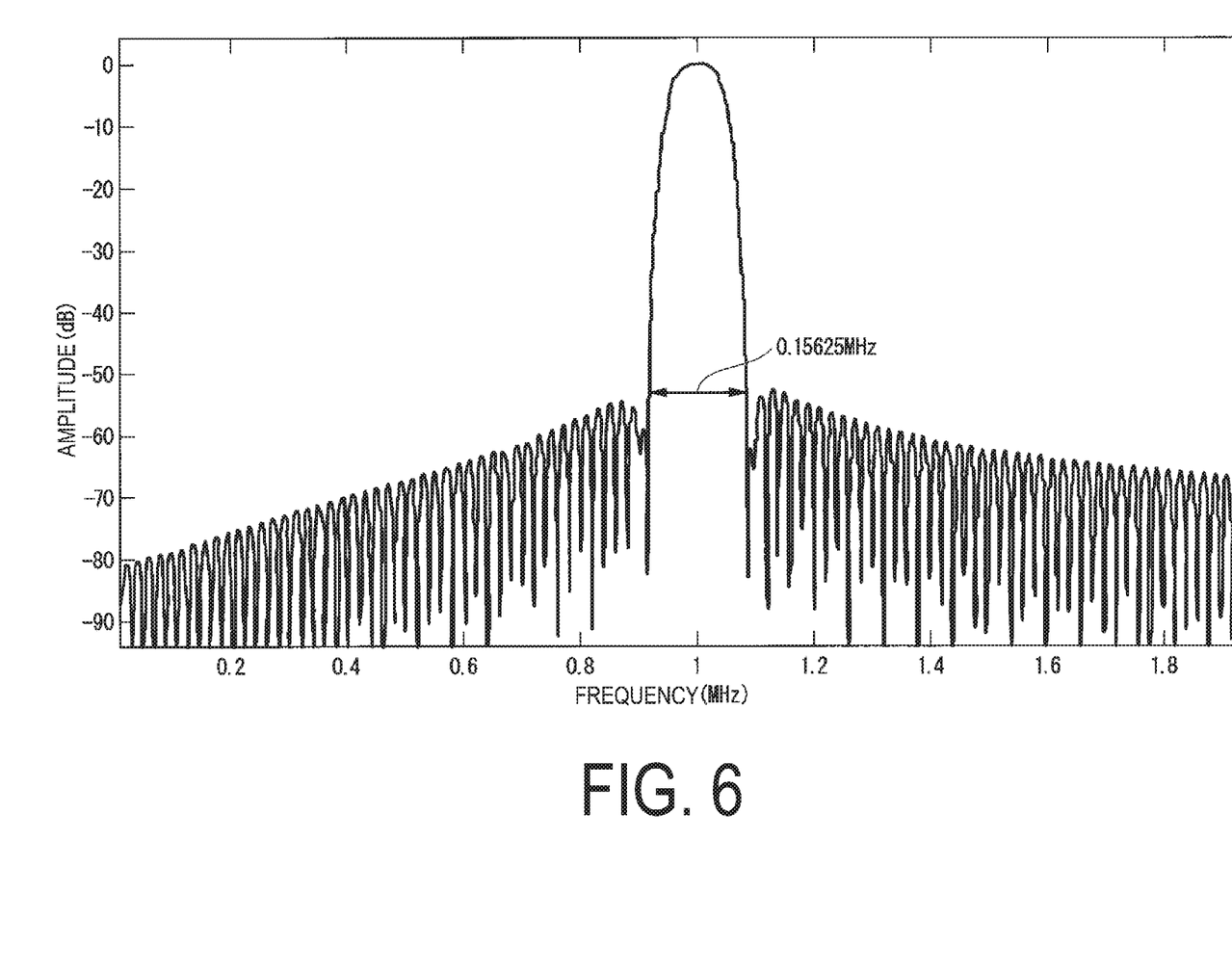
FIG. 6 is a second diagram for explaining the processing of the signal processing unit according to the first embodiment.
Figure 7:
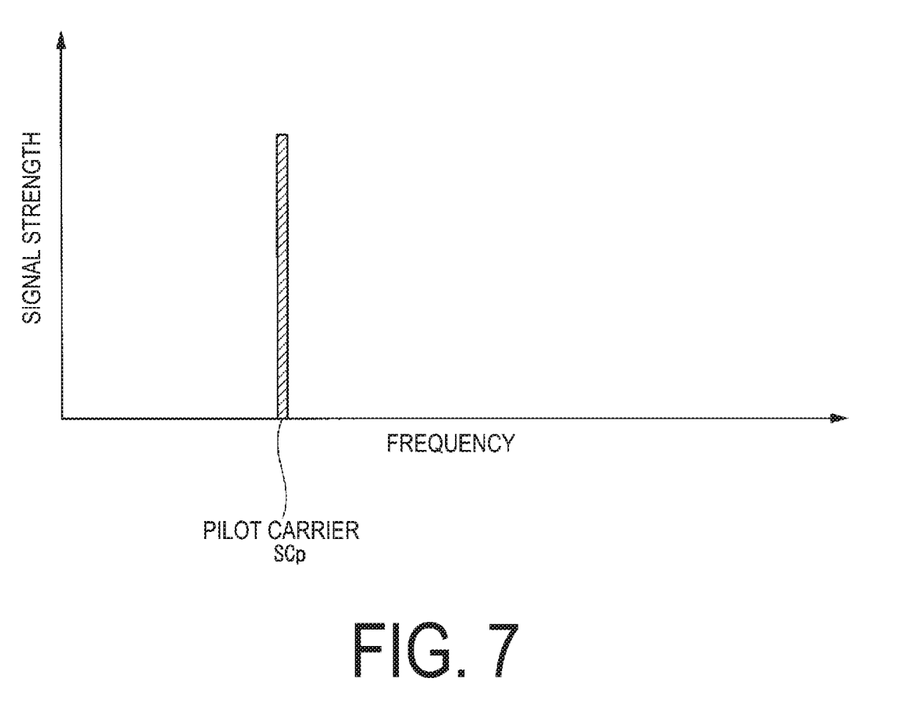
FIG. 7 is a third diagram for explaining the processing of the signal processing unit according to the first embodiment.

FIG. 5 to FIG. 7 are respectively first to third diagrams for explaining processing of the signal processing unit according to the first embodiment.

Next, with reference to the processing flow illustrated in FIG. 4, and FIG. 5 to FIG. 7, the processing of the signal processing unit 15 will be described in concrete terms.

First, the RSSI detection unit 150 of the signal processing unit 15 detects reception of the radio wave (a reception signal) transmitted from the onboard unit A1 on the basis of the RSSI detection result (step S01).

Upon detecting the reception of the radio wave from the onboard unit A1, the automatic amplitude control unit 152 of the signal processing unit 15 performs control (feedback control) of the variable amplifier 13 such that the amplitude of the reception signal is a predefined defined value (step S02).

Here, the reception signal received from the onboard unit A1 will be described with reference to FIG. 5. In a graph illustrated in FIG. 5, the horizontal axis indicates the "frequency" and the vertical axis indicates the "signal strength" (amplitude).

As illustrated in FIG. 5, the reception signal is a frequency-division-multiplexed signal that includes 52 subcarriers SC in one channel. Four predefined specific subcarriers of the 52 subcarriers SC are pilot carriers SCp. Since the pilot carriers SCp are not utilized for data transmission, phase modulation using data is not performed thereon. In addition, of the 52 subcarriers SC, the subcarriers SC other than the pilot carriers SCp are data carriers SCd. Since the data carriers SCd are utilized for data transmission, the phase modulation using data is performed thereon.

Note that in the example illustrated in FIG. 5, the center frequency of the reception signal (channel) is 5900 MHz, but as described above, an error of approximately 20 ppm is actually tolerated. Accordingly, the frequency of each of the 52 subcarriers SC has an error of up to approximately ±118 kHz.

Next, the automatic frequency control units 156a and 156b of the signal processing unit 15 perform frequency adjustment processing on each of the I-component and the Q-component of the reception signal (step S03). As a result of the frequency adjustment processing, the frequency error occurring up to approximately 20 ppm (±118 kHz) in each of the subcarriers is reduced.

Next, the pilot carrier extraction filters 157a and 157b of the signal processing unit 15 accept an input of the reception signal on which the frequency adjustment has been performed, and extract only the frequency components of the pilot carrier (step S04).

Here, FIG. 6 illustrates the filter characteristics of the pilot carrier extraction filters 157a and 157b. As illustrated in FIG. 6, the pilot carrier extraction filters 157a and 157b have the filter characteristics that allow only the pilot carrier (pass-band width=0.15625 MHz) that is separated from the center frequency of 5900 MHz by +1 MHz.

Further, FIG. 7 illustrates a state of the reception signal after filtering processing has been performed by the pilot carrier extraction filters 157a and 157b (step S04). As illustrated in FIG. 7, only the frequency components of the specific pilot carrier pass through the pilot carrier extraction filters 157a and 157b, and the frequency components of the other subcarriers are removed.

Next, the phase signal output unit 158 of the signal processing unit 15 identifies the phase of the pilot carrier based on the I-component and the Q-component of the pilot carrier extracted by the pilot carrier extraction filters 157a and 157b (step S05). The signal processing unit 15 outputs the signal indicating the phase of the pilot carrier (the pilot carrier phase signal) identified by the above-described processing flow.

The angle identification unit 19 illustrated in FIG. 2 calculates the phase difference between the pilot carriers received by each of the antenna elements 10 (FIG. 2) on the basis of the pilot carrier phase signals received from each of the signal processing units 15. The angle identification unit 19 calculates the angle of arrival of the reception signal on the basis of the calculated phase difference of the pilot carriers.

Effects and Benefits

As described above, the angle-of-arrival identification device 1 according to the first embodiment receives the reception signals (the OFDM-type communication signals), each of which includes the plurality of subcarriers SC, using the plurality of antenna elements 10, and identifies the angle of arrival of the reception signals.

The angle-of-arrival identification device 1 includes the signal processing units 15 that extract the predefined specific subcarriers SC from the reception signals received by each of the plurality of antenna elements 10, and the angle identification unit 19 that identifies the angle of arrival on the basis of the phase difference between the specific subcarriers (the pilot carriers SCp) extracted from each of the signal processing units 15.

Further, the signal processing unit 15 includes the automatic frequency control units 156a and 156b (frequency adjustment units) that adjust a deviation, from a defined value, of the frequency of the reception signal received by the antenna element 10, and the pilot carrier extraction filters 157a and 157b (filter units) that extract the specific subcarrier (the pilot carrier SCp) by performing bandpass filter (bandpass filter) processing on the reception signal whose frequency has been adjusted.

Here, in known art, in order to obtain the angle of arrival of the OFDM-type radio wave, a fast Fourier transform (FFT: Fast Fourier Transform) is commonly performed on the reception signal. Specifically, in order to extract a single specific subcarrier from a frequency-division-multiplexed reception signal, it has been necessary to perform fast Fourier transform processing on the reception signal.

However, since the angle-of-arrival identification device 1 according to the present embodiment has the above-described configuration, a desired subcarrier (pilot carrier) only can be extracted directly from the reception signal including the plurality of subcarriers (without performing the fast Fourier transform). Then, the angle of arrival of the radio waves can be identified on the basis of the phase difference between the extracted subcarriers (pilot carriers).

As described above, according to the angle-of-arrival identification device 1 according to the first embodiment, the angle of arrival of the frequency-division-multiplexed radio waves can be identified by simple signal processing.

Note that in the WAVE method, as described above, the frequency error (±118 kHz) of up to 20 ppm is accepted in terms of the given standard. Although this error of 20 ppm (±118 kHz) seems sufficiently small given the scale of the center frequency (5900 MHz), it becomes extremely large when focusing on a single subcarrier (frequency bandwidth=156.25 kHz). In other words, even if the pass band of the pilot carrier extraction filters 157a and 157b is tuned to the frequency band corresponding to the desired single subcarrier (the pilot carrier), in a situation where the frequency error of ±118 kHz may occur in the pass band width of 156.25 kHz, it is difficult to correctly extract only the desired subcarrier via the filters.

Therefore, the angle-of-arrival identification device 1 according to the first embodiment is characterized in that the frequency error is reduced by the automatic frequency control units 156a and 156b, before the reception signal is allowed to pass through the pilot carrier extraction filters 157a and 157h.

In this way, since the frequency error of 20 ppm in the reception signal is also reduced, the desired subcarrier (the pilot carrier) can be accurately extracted through the pilot carrier extraction filters 157a and 157b.

The signal processing unit 15 further includes the automatic amplitude control unit 152 (the amplitude adjustment unit) that adjusts the amplitude of the reception signal received by the antenna element 10 to a predetermined magnitude.

In this way, the signal strength (the amplitude) is automatically adjusted such that the signal strength (the amplitude) is always constant. Thus, distortion of the signal by the amplifier is reduced, and the processing for extracting the subcarrier can be stabilized.

In addition, in the present embodiment, the "specific subcarrier" extracted by the signal processing unit 15 is the pilot carrier on which the phase modulation is not performed for data transmission.

As described above, the pilot carrier is not phase-modulated on the basis of the data to be transmitted. Therefore, a phase comparison between the reception signals (the pilot carriers) received by each of the plurality of antenna elements 10 (FIG. 2) can be conveniently performed.

In other words, when the data carrier, on which the phase modulation is performed on the basis of the data, is utilized to identify the angle of arrival, the phases need to be compared within a range, of the data carrier, which does not include any phase shift caused by the phase modulation. However, when utilizing the pilot carrier, it is not necessary to consider the phase shift caused by the phase modulation at the time of the phase comparison.

Second Embodiment

Next, the toll collection system and the angle-of-arrival identification device according to a second embodiment will be described in detail with reference to FIG. 8.

In the first embodiment, it is described that the signal processing unit 15 of the angle-of-arrival identification device 1 extracts only the single pilot carrier SCp (see FIG. 7) from the frequency-division-multiplexed reception signal.

The signal processing unit 15 of the angle-of-arrival identification device 1 according to the second embodiment extracts all of the plurality (four) of the pilot carriers from the frequency-division-multiplexed reception signal.

Note that the overall configuration and the functional configuration of the angle-of-arrival identification device 1 and the toll collection system 5 according to the second embodiment are the same as those of the first embodiment (FIG. 1 to FIG. 3).

Processing of Signal Processing Unit

Figure 8:
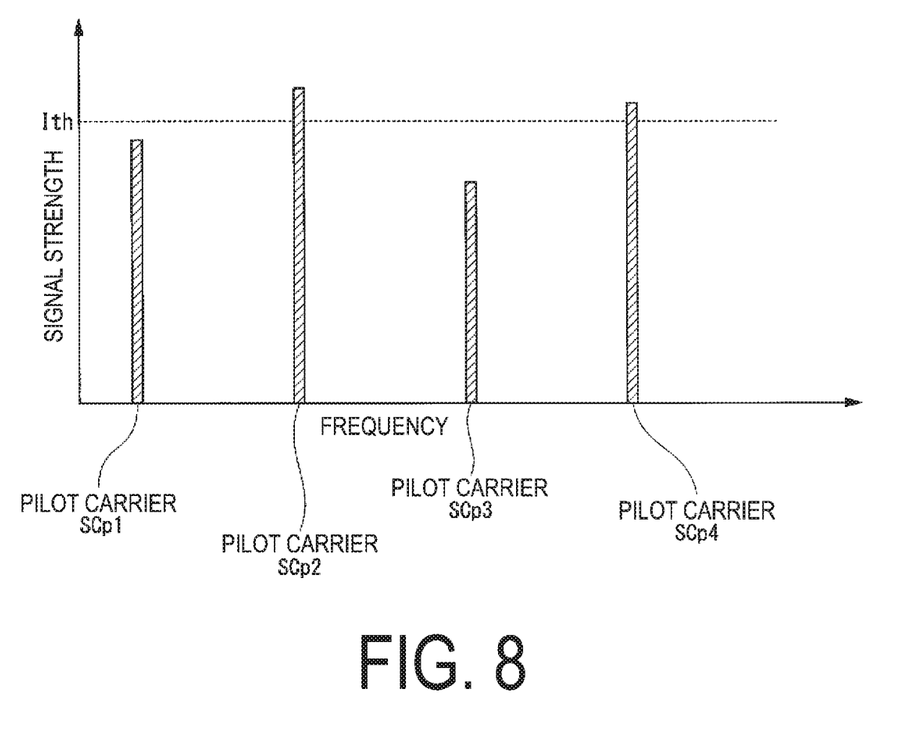
FIG. 8 is a diagram for explaining the processing of the signal processing unit according to a second embodiment.

FIG. 8 is a diagram for explaining processing of the signal processing unit according to the second embodiment.

As illustrated in FIG. 8, the signal processing unit 15 according to the second embodiment extracts all four pilot carriers SCp1 to SCp4.

Specifically, the signal processing unit 15 according to the present embodiment includes the pilot carrier extraction filters 157a and 157b that have bandpass filter characteristics that allow each of the pilot carriers SCp1 to SCp4 to pass through.

Here, multipath fading that can occur in the wireless communications between the onboard unit A1 and the angle-of-arrival identification device 1 will be described. The multipath fading is a phenomenon in which, due to presence of an obstacle on the ground or the like, the radio waves transmitted from the onboard unit A1 travel through a plurality of different paths, and interfere with each other at a reception point (the angle-of-arrival identification device 1), thereby causing the signal strength of the reception signals to fluctuate. The degree of fluctuation of the signal strength is determined by the relationship between the frequencies of the radio waves and the path difference. In other words, even if the same path has been followed, in a case where the frequencies of the radio waves are different, the degree of influence of the multipath fading is different.

Since the frequencies of the four pilot carriers SCp1 to SCp4 are different, as illustrated in FIG. 8, the degree of fluctuation of the signal strength due to the multipath fading is also different.

The signal processing unit 15 refers to the I-component and the Q-component of each of the four pilot carriers extracted through the pilot carrier extraction filters 157a and 157b, and calculates the signal strength of each of the pilot carriers SCp1 to SCp4. Then, the signal processing unit 15 selects the pilot carrier having the highest signal strength (the pilot carrier SCp2 in the example illustrated in FIG. 8). Further, the signal processing unit 15 identifies a phase on the basis of the I-component and the Q-component of the selected pilot carrier SCp2, and outputs, toward the angle identification unit 19 (FIG. 2), a pilot carrier phase signal indicating the phase.

As described above, the angle-of-arrival identification device 1 (the signal processing unit 15) according to the second embodiment is characterized in that the plurality of pilot carriers having mutually different frequencies are extracted.

In this way, even if the multipath fading occurs, the subcarrier (the pilot carrier) on which the influence of the multipath fading is small can be selected from among the subcarriers, and the angle of arrival can be identified on the basis of the selected subcarrier. Therefore, the angle-of-arrival identification device 1 becomes less susceptible to the influence of the multipath fading, and reliability of the function to identify the angle of arrival can be improved.

Details of the angle-of-arrival identification device 1 according to the second embodiment are described above. However, a specific aspect of the angle-of-arrival identification device 1 is not limited to the one described above, and various design modifications and the like can be made without departing from the gist.

For example, the angle-of-arrival identification device 1 according to the second embodiment is configured to select the pilot carrier having the highest signal strength among the four pilot carriers SCp1 to SCp4, and to identify the angle of arrival on the basis of the phase difference of the selected pilot carrier. However, other embodiments are not limited to this aspect.

The angle-of-arrival identification device 1 (the signal processing unit 15) according to a modified example of the second embodiment may be an aspect in which a pilot carrier whose signal strength exceeds a predefined signal strength threshold Ith (see FIG. 8) is selected from among the four pilot carriers SCp1 to SCp4. In the example illustrated in FIG. 8, the signal processing unit 15 selects two of the pilot carriers, namely, the pilot carrier SCp2 and the pilot carrier SCp4.

In this case, the signal processing unit 15 further outputs, to the angle identification unit 19, both a pilot carrier phase signal indicating the phase of the pilot carrier SCp2 and a pilot carrier phase signal indicating the phase of the pilot carrier SCp4. Then, the angle identification unit 19 identifies the angle of arrival on the basis of an average value "$(\theta 2+\theta 4)/2$" of a phase difference $\theta 2$ of the pilot carrier SCp2 and a phase difference $\theta 4$ of the pilot carrier SCp4.

Further, the angle-of-arrival identification device 1 (the signal processing unit 15) according to yet another modified example may output, to the angle identification unit 19, a pilot carrier phase signal indicating all the phases of each of the pilot carriers SCp1 to SCp4, on the basis of the I-component and the Q-component of each of the four pilot carriers SCp1 to SCp4. In this case, the angle identification unit 19 may identify the angle of arrival on the basis of an average value "$(\theta 1+\theta 2+\theta 3+\theta 4)/4$" of phase differences $\theta 1$ to $\theta 4$ of each of the pilot carriers SCp1 to SCp4.

The angle-of-arrival identification device 1 according to the first embodiment and the second embodiment is described above as being a device that identifies the angle of arrival on the basis of the phase difference between the "pilot carriers" (the subcarriers on which the phase modulation is not performed) received by the plurality of antenna elements 10. However, other embodiments are not limited to this aspect.

Specifically, the angle-of-arrival identification device 1 according to another embodiment may identify the angle of arrival on the basis of the phase difference of the "data carriers" that are regarded as the "specific subcarriers." In this case, the angle-of-arrival identification device 1 may identify the phase difference by comparing points (phase change points) at which a phase has been switched due to phase modulation, among the reception signals (the data carriers) received by the plurality of antenna elements 10.

In the foregoing, certain embodiments of the present invention have been described, but these embodiments are merely illustrative and are not intended to limit the scope of the invention. These embodiments may be implemented in various other forms, and various omissions, substitutions, and alterations may be made without departing from the gist of the invention. These embodiments and modifications are included in the scope and gist of the invention and are also included in the scope of the invention described in the claims and equivalents thereof.

INDUSTRIAL APPLICABILITY

According to the angle-of-arrival identification device, the toll collection system, and the angle-of-arrival identification method described above, the angle of arrival of the frequency-division-multiplexed radio wave can be identified by simple signal processing.

REFERENCE SIGNS LIST

1 Angle-of-arrival identification device
10 Antenna element
11 High-frequency amplifier
12 Mixer
13 Variable amplifier
14 A/D converter
15 Signal processing unit
150 RSSI detection unit
151 Higher harmonic elimination filter
152 Automatic amplitude control unit (amplitude adjustment unit)
153*a*, 153*b* Mixer
154 Local transmitter
155*a*, 155*b* Low pass filter
156*a*, 156*b* Automatic frequency control unit (frequency adjustment unit)
157*a*, 157*b* Pilot carrier extraction filter (filter unit)
158 Phase signal output unit
19 Angle identification unit
2 Antenna for toll collection
5 Toll collection system

The invention claimed is:

1. An angle-of-arrival identification device that receives a reception signal including a plurality of subcarriers, using a plurality of antenna elements, and identifies an angle of arrival of the reception signal, the angle-of-arrival identification device comprising:

a signal processing unit configured to extract predefined specific subcarriers from the reception signal received using each of the plurality of antenna elements; and an angle identification unit configured to identify the angle of arrival based on a phase difference of the specific subcarriers extracted from each of the signal processing units, wherein the signal processing unit includes a frequency adjustment unit configured to adjust a deviation, from a defined value, of a frequency of the reception signal received using the antenna element, and a filter unit configured to extract the specific subcarriers having mutually different frequencies by performing bandpass filter processing on the reception signal whose frequency has been adjusted, wherein the signal processing unit is configured to identify a phase of a subcarrier having a highest signal strength among the specific subcarriers and output a signal indicating the phase, and wherein the specific subcarriers are pilot carriers on which phase modulation for data transmission is not performed.

2. The angle-of-arrival identification device according to claim 1, wherein the signal processing unit further includes an amplitude adjustment unit configured to adjust, to a predetermined magnitude, an amplitude of the reception signal received using the antenna element.

3. A toll collection system comprising:
the angle-of-arrival identification device according to claim 1.

4. An angle-of-arrival identification method that receives a reception signal including a plurality of subcarriers, using a plurality of antenna elements, and identifies an angle of arrival of the reception signal, the angle-of-arrival identification method comprising:
  a signal processing step for extracting predefined specific subcarriers from the reception signal received using each of the plurality of antenna elements; and
  an angle identifying step for identifying the angle of arrival based on a phase difference of the specific subcarriers extracted in each of the signal processing steps, wherein
  the signal processing step includes
  a frequency adjustment step for adjusting a deviation, from a defined value, of a frequency of the reception signal received by the antenna element, and
  a filtering step for extracting the specific subcarriers having mutually different frequencies by performing bandpass filter processing on the reception signal whose frequency has been adjusted,
  wherein the signal processing step includes a step for identifying a phase of a subcarrier having a highest signal strength among the specific subcarriers and outputting a signal indicating the phase, and
  wherein the specific subcarriers are pilot carriers on which phase modulation for data transmission is not performed.

5. A non-transitory computer-readable medium that stores a program causing a computer serving as an angle-of-arrival identification device that receives a reception signal including a plurality of subcarriers, using a plurality of antenna elements, and identifies an angle of arrival of the reception signal, the angle-of-arrival identification device comprising:
  a signal processing unit configured to extract predefined specific subcarriers from the reception signal received using each of the plurality of antenna elements; and
  an angle identification unit configured to identify the angle of arrival based on a phase difference of the specific subcarriers extracted from each of the signal processing units, wherein
  the signal processing unit includes
  a frequency adjustment unit configured to adjust a deviation, from a defined value, of a frequency of the reception signal received using the antenna element, and
  a filter unit configured to extract the specific subcarriers having mutually different frequencies by performing bandpass filter processing on the reception signal whose frequency has been adjusted,
  wherein the signal processing unit is configured to identify a phase of a subcarrier having a highest signal strength among the specific subcarriers and output a signal indicating the phase, and
  wherein the specific subcarriers are pilot carriers on which phase modulation for data transmission is not performed.

* * * * *